Jan. 22, 1924.  L. C. WEINBERG  1,481,400

FOLDING WING MONOPLANE

Filed Nov. 17, 1921

Inventor
L. C. Weinberg
Robert H. Young
By
Attorney

Patented Jan. 22, 1924.

1,481,400

UNITED STATES PATENT OFFICE.

LOWELL C. WEINBERG, OF DAYTON, OHIO.

FOLDING-WING MONOPLANE.

Application filed November 17, 1921. Serial No. 515,792.

*To all whom it may concern:*

Be it known that I, LOWELL C. WEINBERG, a citizen of the United States, residing at Dayton, in the county of Montgomery and State of Ohio, have invented certain new and useful Improvements in Folding-Wing Monoplanes, of which the following is a specification.

This invention relates in general to aircraft and more particularly to monoplanes provided with wings adapted to be folded adjacent to and parallel with the fuselage for the purpose of saving space in the storage or shipping of aircraft.

It is the object of this invention to provide an aircraft with wings so connected to the fuselage that the wings may be moved into and locked in operative position for flying or to be swung rearwardly, adjacent to and parallel with the fuselage in such a manner that will require the simplest mechanism and operation of same, and also in order that the aircraft will occupy the minimum space while in inoperative position.

It is proposed to provide the fuselage with a channeled guideway to receive the end of the wing struts. Suitable connections are arranged between the wings and the fuselage to allow the wings to be swung into a vertical position and then swung rearwardly against and parallel with the fuselage, this operation being guided by means of the wing strut in the channeled guideway.

With the foregoing and other objects, which will appear as the description proceeds, the invention resides in a combination of parts and in the details of construction hereinafter described and claimed, it being fully understood that changes in the precise embodiment herein described may be made without departing from the spirit of the invention illustrated in the attached drawings, in which:

Figure 1:
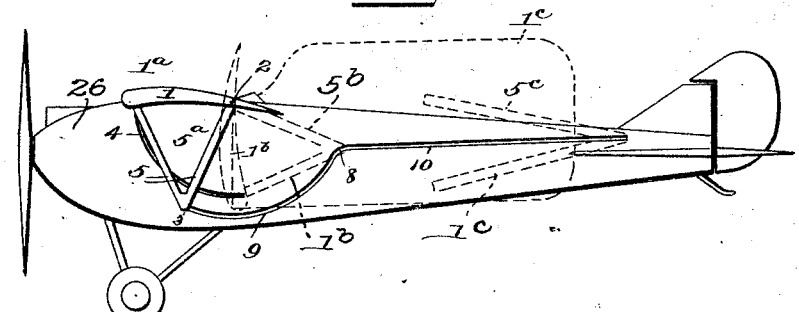
Figure 1 is a side view of the aircraft, showing the normal position of the wings and also in dotted lines the wings shifted to a vertical position and further the wings in a position parallel with the fuselage.

Referring more particularly to the drawings, Figure 1 shows, in a side view, the aircraft wings 1 and wing struts 5 in flying position at $1^a$ and $5^a$, in vertical position in dotted lines at $1^b$ and $5^b$, and in vertical and rearwardly swung position at $1^c$ and $5^c$ respectively. Each wing has near its leading edge a hinge, one member of which is slidably engaged with an arcuate channeled guideway 4 in the side of the fuselage, concentric with the hinge at a point 2, one member of the hinge being swiveled in the fuselage at its point of attachment. Each hinge on either side of the fuselage has two axes in coincidence and each slot 4 is of sufficient length to permit the corresponding wing to turn on its longitudinal axis through 90° plus the angle of attack at which the wing is set in flying position. Thus when the locking device at the leading edge of the wing is released, the wing may be swung into a vertical position and then be further swung upon the hinge horizontally into an inoperative position alongside, adjacent to and parallel with the fuselage. Any suitable means for shifting the wings manually while in the pilot's cockpit, such as cables and drums or the like, may be employed.

The wing struts 5 for pressing the wings are hinged at their points of connection 6 with the wings near the leading and trailing edges of the latter and are connected to their point of convergence 3 to a suitable sliding member which may be adapted to slide in the channeled guideway 8, provided in the adjacent side of the fuselage. This guideway is provided with an arcuate portion 9 concentric with the wing hinge at point 2, and also is provided with an intercommunicating straight portion 10 which extends therefrom longitudinally towards the empennage of the aircraft.

Thus if the wing is rotated from the normal horizontal flying position to an inoperative vertical position, the sliding member provided at point 3 will slide through the arcuate portion 9 of the guideway 8 and upon further shifting of the wing rearwardly will follow the straight portion 10 of the guideway. During the latter shift of the wings rearwardly against the fuselage, the struts 5 will turn upon their hinges until the struts lie flat against and parallel with the fuselage as shown in dotted lines at 1ᶜ and 5ᶜ in Figure 1.

Figure 5:
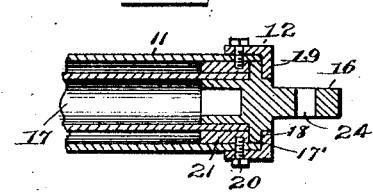
Figure 5 is a longitudinal section through one of the hinged members showing the rotatable member inside of the stationary member attached to the rear spar in the center section.
Figure 3:
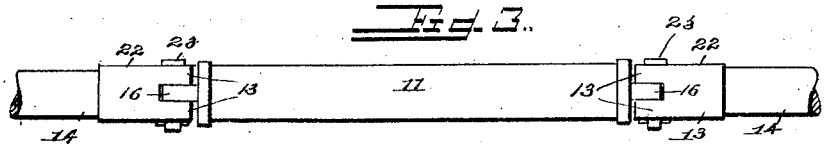
Figure 3 is a plan view of the means of attachment of the rear spar of the center section to that of the wings.
Figure 4:
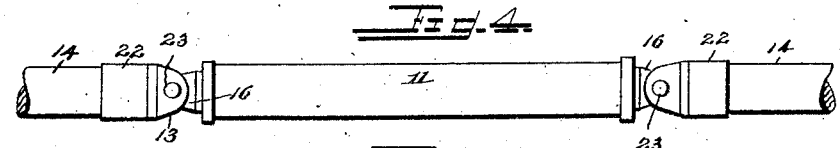
Figure 4 is a side view of the same.

As shown more clearly in Figures 3, 4, and 5, a hollow cylindrical stationary member 11 is attached to the rear spar of the center section 22 and is provided with a rotatable barrel 17, maintained inside thereof by means of an extension on member 17' provided with a shoulder 18 abutting against the unturned flange 19 of the cap 12 connected to the bearing block 21 by means of screws 20. The block 21 provides a bearing member between the rotating member 17 and the stationary member 11. The projection 16 on the member 17 is provided with an aperture 24 to receive a locking pin 23, also passing through the bifurcated ends 13 of the member 14 which is attached to the rear spar of the wing proper.

It will be easily seen that by this construction, the wings may first be rotated until they assume a vertical position by reason of the rotatability of the member 17 within the stationary member 11. Secondly, by means of the hinged connections between the members 14 and the members 17 at either end thereof, the wings may, while in this vertical inoperative position, be swung laterally and rearwardly upon said hinged connections to a position adjacent to and parallel with the aircraft fuselage.

Figure 2:
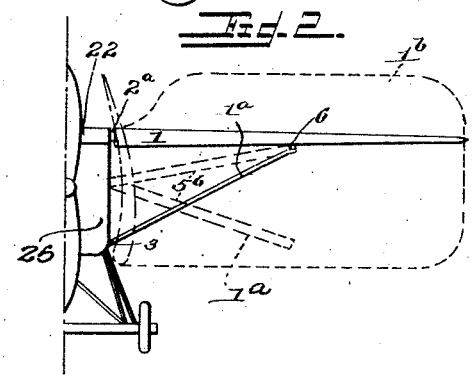
Figure 2 is a front elevation of one side of the aircraft showing one wing in the various positions described in Figure 1.
Figure 6:
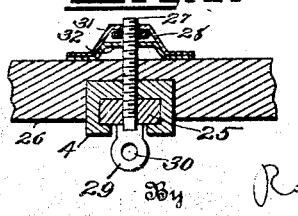
Figure 6 is a detailed view of the locking means for retaining the wings in a locked position with relation to the fuselage.

It will be evident that in the provision of such shiftable wings as hereinbefore described, secure and easily operable locking means must be provided for the purpose of locking the wings either in operative or inoperative position. For this purpose there is therefore provided a screw bolt 27 engaged by a screw threaded sprocket 28 adapted to be operated by any suitable means such as pulleys and the like extending to the pilot's cockpit. Guards 31 and 32 are provided around said sprocket as shown in Figure 6. The channeled guideway 4 being fitted in the fuselage 26 is adapted to receive the sliding member 25 heretofore described as in "any suitable sliding member." The sliding member 25 is integrally attached to the lug 29 provided with a hole 30 thus adapting same to be connected to the front spar of the wing at a point 2ᵃ in Figure 2. As the bolt 27 is screwed through the fuselage 26 in guideway 4 and into the block 25, the wings are locked in the desired position, either operative or inoperative. Naturally as the screw bolt 27 is retracted by the operation of the sprocket 28 the wings will be free to be shifted to any desired position.

It will thus be seen that I have provided an aircraft with wings so connected to the fuselage thereof that the wings may be unlocked from the normal flying position, rotated to a vertical position, and subsequently be swung laterally and rearwardly to a position adjacent to and parallel with the fuselage and also locked in such position. This operation may be reversed both of said operations being possible by the actuation of suitable pulleys and cables operable by the pilot while in the cockpit.

While I have described my invention as conforming with the illustrations, I wish to limit same only to such an extent that it will fall within the broadest interpretation of the appended claims.

Having thus described my invention, I claim:

1. In an aircraft, hinged connections between the center section and the wings of said aircraft, said connections being adapted to enable the wings to be rotated from a substantially horizontal flying position to a vertical position and subsequently laterally swung rearwardly parallel with the fuselage of said aircraft to a folded position, sliding members on the inner end of the front spar of each of said wings, arcuate channeled guideways in said fuselage along which said sliding members are movable, and means operable by the pilot in the fuselage for shifting said wings from their normal operative position to their folded position and vice versa.

2. In an aircraft, hinged connections between the center section and the wings of said aircraft, said connections being adapted to enable the wings to be rotated from a substantially horizontal flying position to a vertical position and subsequently laterally swung rearwardly parallel with the fuselage of said aircraft, sliding members on the inner end of the front spar of each of said wings and adapted to slide in arcuate channeled guideways in said fuselage, supporting struts between said wings and said fuselage, said fuselage being also provided with additional channeled guides for the purpose of receiving sliding members on the ends of said struts.

3. In an aircraft, hinged connections between the center section and wings of said aircraft, said connections comprising a stationary hollow cylindrical member attached to the rear spar of said center section, a cylindrical hinge member rotatably mounted therein, said rotatable member being hingedly connected at either end to the inner end of a member attached to the rear spar of each wing, for the purpose of enabling the wings to be rotated from a substantially horizontal flying position to a vertical position and subsequently laterally swung rearwardly parallel with the fuselage of said aircraft, sliding members provided on the lower ends of the supporting struts of said wings, and additional sliding members on the inner end of the front spar of each of said wings, channeled guideways for receiving the sliding members on said struts, and channeled guideways for receiving the sliding members on said wing spars for the purpose of guiding and limiting the rotation of the wings about their horizontal axes and subsequently about their vertical axes.

4. In an aircraft, hinged connections between the center section and the wings of said aircraft, said connections being adapted to enable the wings to be rotated from a substantially horizontal flying position to a vertical position and subsequently laterally swung rearwardly parallel with the fuselage of said aircraft, sliding members being provided on the inner end of the front spar of each of said wings and adapted to slide in an arcuate channeled guideway in said fuselage, suitable means operable by the pilot for shifting said wings, and means for locking said wings in any desired position, said locking means comprising a screw bolt, adapted to be screwed through said fuselage, channeled guideways, and sliding members, for the purpose of holding each against movement with relation to each other, a sprocket in screw-threaded engagement with said screw bolt and adapted to be operated by suitable means for advancing said screw bolt into locking position and retracting same therefrom to a releasing position.

5. In an aircraft, hinged connections between the center section and wings of said aircraft, said connections comprising a stationary hollow cylindrical member attached to the rear spar of said center section, a cylindrical hinge member rotatably mounted therein, said rotatable member being hingedly connected at either end to the inner end of a member attached to the rear spar of each wing, for the purpose of enabling the wings to be rotated from a substantially horizontal flying position to a vertical position and subsequently laterally swung rearwardly parallel with the fuselage of said aircraft, sliding members provided on the lower ends of the supporting struts of said wings, and additional sliding members on said struts, and channeled guideways for receiving the sliding members on said wing spars for the purpose of guiding and limiting the rotation of the wings about their horizontal axes and subsequently about their vertical axes, suitable means operable by the pilot for shifting said wings, and means for locking said wings in any desired position, said locking means comprising a screw bolt, adapted to be screwed through said fuselage, channeled guideways, and sliding members, for the purpose of holding each against movement with relation to each other, a sprocket in screw-threaded engagement with said screw bolt adapted to be operated by suitable means for advancing said screw bolt into locking position and retracting same therefrom to a releasing position.

In testimony whereof I have affixed my signature.

LOWELL C. WEINBERG.